United States Patent [19]

Sugitani et al.

[11] Patent Number: 4,905,017

[45] Date of Patent: Feb. 27, 1990

[54] LAMINATED LIQUID-JETTING HEAD CAPABLE OF RECORDING IN A PLURALITY OF COLORS, A METHOD OF PRODUCING THE HEAD AND AN APPARATUS HAVING THE HEAD

[75] Inventors: Hiroshi Sugitani, Machida; Hiroto Matsuda, Yokohama; Masami Ikeda, Machida, all of Japan

[73] Assignee: Canon Kabushiki Kaisha, Tokyo, Japan

[21] Appl. No.: 178,881

[22] Filed: Apr. 5, 1988

Related U.S. Application Data

[63] Continuation of Ser. No. 865,409, May 21, 1986, abandoned, which is a continuation of Ser. No. 451,500, Dec. 20, 1982, Pat. No. 4,611,219.

[30] Foreign Application Priority Data

| | | | |
|---|---|---|---|
| Dec. 29, 1981 | [JP] | Japan | 56-215328 |
| Dec. 29, 1981 | [JP] | Japan | 56-215329 |
| Dec. 29, 1981 | [JP] | Japan | 56-215330 |

[51] Int. Cl.[4] .......................... G01D 15/16; B41J 3/04

[52] U.S. Cl. ................................ 346/1.1; 346/140 R

[58] Field of Search ................................ 346/1.1, 140

[56] References Cited

U.S. PATENT DOCUMENTS

| | | | |
|---|---|---|---|
| 2,685,916 | 8/1954 | Martt . | |
| 2,735,482 | 2/1956 | Tuttle . | |
| 3,747,120 | 7/1973 | Stemme . | |
| 3,988,745 | 10/1976 | Sultan | 346/140 |
| 4,015,271 | 3/1977 | Sultan . | |
| 4,275,290 | 6/1981 | Cielo et al. . | |
| 4,296,421 | 10/1981 | Hara | 346/140 |
| 4,330,787 | 5/1982 | Sato et al. | 346/140 |
| 4,392,145 | 7/1983 | Parkola . | |
| 4,412,224 | 10/1983 | Sugitani . | |
| 4,490,728 | 12/1984 | Vaught | 346/140 X |
| 4,528,575 | 7/1985 | Matsuda | 346/140 |
| 4,558,333 | 12/1985 | Sugitani | 346/140 |
| 4,611,219 | 9/1986 | Sugitani | 346/140 |

FOREIGN PATENT DOCUMENTS

| | | |
|---|---|---|
| 0037624 | 10/1981 | European Pat. Off. . |
| 0067889 | 12/1982 | European Pat. Off. . |
| 55-101466 | 2/1980 | Japan . |

*Primary Examiner*—Joseph W. Hartary

*Attorney, Agent, or Firm*—Fitzpatrick, Cella, Harper & Scinto

[57] ABSTRACT

A method of producing a liquid-jetting head capable of recording in a plurality of colors comprises the steps of providing a base member having a plurality of heaters thereon, at least one plate member having at least one perforation therethrough with a predetermined shape and an orifice plate having holes therethrough, and laminating the base member, plate member and orifice plate together to provide a laminated liquid-jetting head having a plurality of liquid supply paths, each including a branched liquid path, formed by the perforation, from which liquid can be ejected through the orifices by the action of heat energy applied to the liquid in the liquid path by the heaters. Also disclosed is an image recording apparatus using the laminated liquid-jetting head.

13 Claims, 8 Drawing Sheets

LAMINATED LIQUID-JETTING HEAD CAPABLE OF RECORDING IN A PLURALITY OF COLORS, A METHOD OF PRODUCING THE HEAD AND AN APPARATUS HAVING THE HEAD

This application is a continuation of application Ser. No. 865,409 filed May 21, 1986, now abandoned, which in turn is a continuation of U.S. Ser. No. 451,500, filed Dec. 20, 1982, now U.S. Pat. No. 4,611,219.

BACKGROUND OF THE INVENTION

1. Field of the Invention

This invention relates to liquid-jetting heads and more particularly to liquid-jetting heads suited for producing droplets of recording liquid (ink) in ink-jet recording systems.

2. Description of the Prior Art

The ink-jet recording system is a method for recording by ejecting a recording liquid called "ink" through fine nozzles, while transforming the liquid into droplets in various ways (e.g. by application of electrostatic attraction, utilization of oscillation of piezo elements, and so on), and causing the droplets to adhere onto recording paper or the like. Liquid-jetting heads used in this system are generally provided with fine-jetting nozzles (orifices), liquid passages, and liquid-jetting energy generators, such as piezo elements or heating elements, which are set up in the ihdividual liquid-passages and generate the droplet-forming energy to exert the liquid. As in the fields of other recording systems, research and development has been made, in the field of ink-jet recording systems, for the purpose of realizing multicolor or full-color recording in addition to monochromatic recording. Liquid-jetting heads for multicolor or full-color recording need each to have a plurality of separated liquid passages and orifices for each color liquid in order to separately introduce and eject different color inks. Heretofore, however, satisfaction of the above requirements was accompanied by such difficulties that the inner structure of the heads became extremely complicated and reliable heads are hence difficult to obtain and that the heads, becoming large in size, are hardly adaptable in particular for the so-called serial recording, which performs recording with moving heads. Additionally, in order to accomplish high-speed and high-resolution recording, it is necessary for multicolor or full-color ink-jet recording heads each to have plural orifices, liquid passages, and liquid-jetting energy generators (liquid-jetting pressure generators) arranged all in much higher density. The prior art recording heads multiplied in components and integrated in a high density have drawbacks such as insufficient refilling of ink into the heads, infeasibility to accomplish real high-speed recording, and incapability of attaining high responsiveness to signals.

Another important subject imposed on liquid-jetting heads is to densify ink dots on recording paper for the purpose of improving the quality of letters printed (continuous dots are preferred in quality). However, according to the prior art, it has been very difficult on account of restrictions upon the fabrication technique to obtain such heads that give high-density ink dots.

SUMMARY OF THE INVENTION

The primary object of this invention is to eliminate the foregoing drawbacks of the prior art.

Thus, an object of this invention is to provide a small-sized liquid-jetting head having compacted multi-orifices.

Another object of this invention is to provide a liquid-jetting head highly valuable in practical use having both a high-speed recording function and a high-density recording function.

A further object of this invention is to provide a thin, compact liquid-jetting head capable of giving steadily high-density ink dots.

A still further object of this invention is to provide a liquid-jetting head suited for multicolor or full-color recording.

According to the present invention, there is provided a liquid-jetting head comprising a plurality of liquid-jetting-pressure-generating elements and a plurality of liquid-jetting orifices opposite to said elements through a liquid passage, characterized in that said passage is divided into at least two groups, and the adjacent elements of said elements are separately communicated with isolated respective liquid passages.

According to another aspect of the present invention, a method of producing a liquid-jetting head comprises the steps of providing a base member having a plurality of heaters thereon, at least one plate member having at least one perforation therethrough with a predetermined shape and an orifice plate having holes therethrough, and laminating the base member, plate member and orifice plate together to provide a liquid-jetting head having a branched liquid path, formed by the perforation, from which liquid can be ejected through the orifices by the action of heat energy applied to the liquid in the liquid path by the heaters.

DETAILED DESCRIPTION OF PREFERRED EMBODIMENTS OF THE INVENTION

Figure 1:
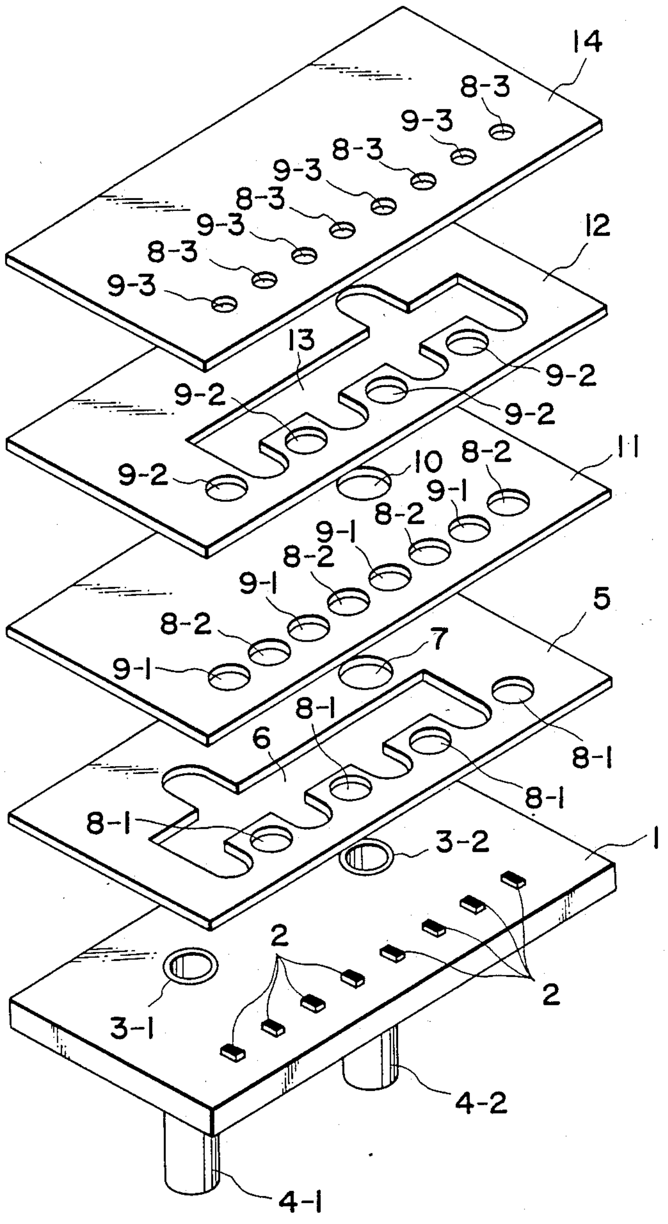
FIG. 1 is an exploded persepective view of an embodiment of this invention.

Referring now to the drawings, this invention is described in detail.

As shown in FIG. 1, which is an exploded perspective view of an embodiment of the present liquid-jetting head, a desired number (eight in FIG. 1) of liquid-jetting-pressure-generating elements 2, such as heating elements or piezo elements, for generating the liquid-jetting pressure are first disposed on a base plate 1 made of a suitable material selected from glass, ceramics, plastics, silicon, metals, or the like. The jetting-pressure is generated, when said elements 2 are heating elements, by heating their neighboring liquid therewith, and when said elements 2 are piezo elements, by mechanical oscillation thereof. These elements 2 are connected each to an input-signal-applying electrode, which is not depicted. For this purpose the multilayer wiring method can be applied which utilizes a fabrication technique, for example, photolithography or vacuum deposition. The base plate 1 is penetrated with two perforations 3-1 and 3-2, to which conduits 4-1 and 4-2 are fitted, respectively. In this case, the conduit 4-1 communicates with the first liquid chamber mentioned below.

A plate 5, which laid on the upper surface (having the elements 2) of the base plate 1, has (1) a perforation 7 communicating with the conduit 4-2, (2) an opening 6 as the first liquid chamber which communicates at a restricted space thereof with the conduit 4-1 and faces at restricted spaces thereof the alternate elements 2, and (3) perforations 8-1 which separately face the alternate elements 2 other than the above. Another plate 11, which is laid on the upper surface of the plate 5, has (1) a perforation 10 communicating with the perforation 7, (2) perforations 8-2 communicating separately with the individual perforations 8-1, and (3) perforations 9-1 communicating separately with the above-said spaces of the opening 6 which separately face the alternate elements 2. Accordingly, the perforations 8-2 and 9-1 are aligned so as to correspond with the elements 2 one by one. A plate 12, which is laid on the upper surface of the plate 11, has an opening 13 as the second liquid chamber which is similar in shape to the opening 6 but communicates with the perforations 8-2 and with the conduit 4-2 through perforations 7 and 10, and perforations 9-2 which separately communicate with the individual perforations 9-1. A plate 14, which is the top plate laid on the upper surface of the plate 12, has perforations 8-3 and 9-3 as liquid-jetting orifices which are aligned so as to correspond with the elements 2 one by one.

The base plate 1 and the plates 5, 11, 12, and 14, described above, are superposed one over another, adjusted to hold the perforations and openings in position, and joined into a single body with an adhesive, screws, or the like. The plates 5, 11, 12, and 14 can be formed from any material suitably selected from silicon, glass, ceramics, plastics, and metals (desirably anti-corrosive to the liquid). The formation of the perforations and openings can be accomplished by various methods including drilling, molding, punching, etching, a method that photoresist is image-exposed and developed, followed by removing the portions corresponding to the perforations and openings by dissolution. For the base plate 1, materials of high impact strength are suited when piezo elements are used as the elements 2, and materials having good heat-resisting and heat-releasing properties are suited when heating elements are used as the elements 2. Somewhat elastic materials can also be used for the plates 5, 11, 12, and 14, and the cross sections of the perforations in these plates are not limited to be circular as shown in FIG. 1 but permitted to be, for example, rectangular or elliptic.

Because the thus constructed head of FIG. 1 has the two isolated liquid chambers and the two isolated groups of liquid paths, multicolor ink-jet recording such as dichromatic ink-jet recording can readily be realized by operating the head while introducing separately different-color inks thereto.

Figure 2:
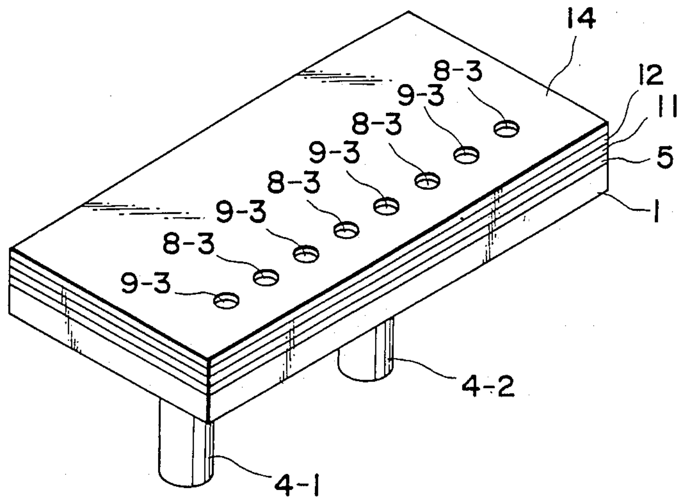
FIG. 2 is an external perspective view of the above embodiment.

In FIG. 2, which is a perspective view of the head of FIG. 1 after completion of its assembly, the same symbols as in FIG. 1 have the same meaning as explained above.

Figure 3:
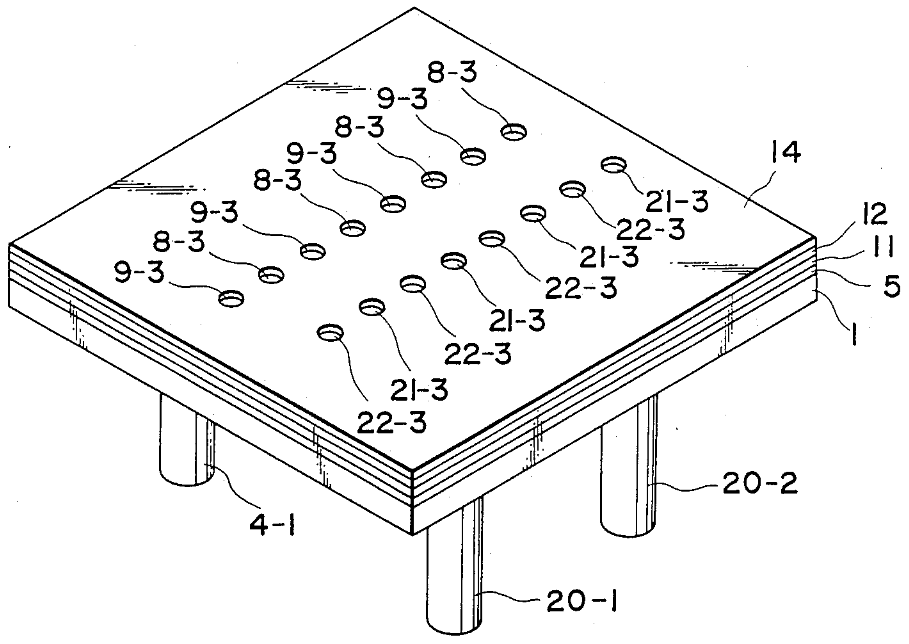
FIG. 3 is an external perspective view of another embodiment of this invention.

FIG. 3 shows a perspective view of another completed liquid-jetting head which comprises two parallel-disposed heads having nearly the same structure as the head of FIG. 1, that is, which has two rows of liquid-jetting orifices. In FIG. 3, the same symbols as in FIG. 1 have the same meaning as explained above, 20-1 and 20-2 represent conduits for the liquid, and 21-3 and 22-3 represent liquid-jetting orifices. Having four isolated liquid chambers and four isolated groups of liquid passages, the head of FIG. 3 is favorably used for multicolor or full-color recording by introducing separately different-color inks (e.g. yellow, cyan, magenta, and black) into the head. It is also possible, though not illustrated by the drawing, that the head of FIG. 1 is modified to construct three of more isolated liquid chambers in the direction of the thickness of the head (the number of plates used will slightly increase).

As described in detail, the above type of liquid-jetting head is advantageous in the following respects:

1. Since a plurality of isolated liquid chambers (and of isolated groups of liquid passages) are integrated at high density in the head, multicolor or full-color ink-jet recording can be readily performed by introducing each of different-color inks into each isolated liquid chamber (and isolated groups of liquid passage) of the head.

2. Since a plurality of liquid chambers (and of liquid passages) are integrated in the direction of the thickness of the head, the liquid-jetting head can be made thin and compact.

3. Therefore, the liquid-jetting head can be readily adapted for the serial recording system.

Figure 4:
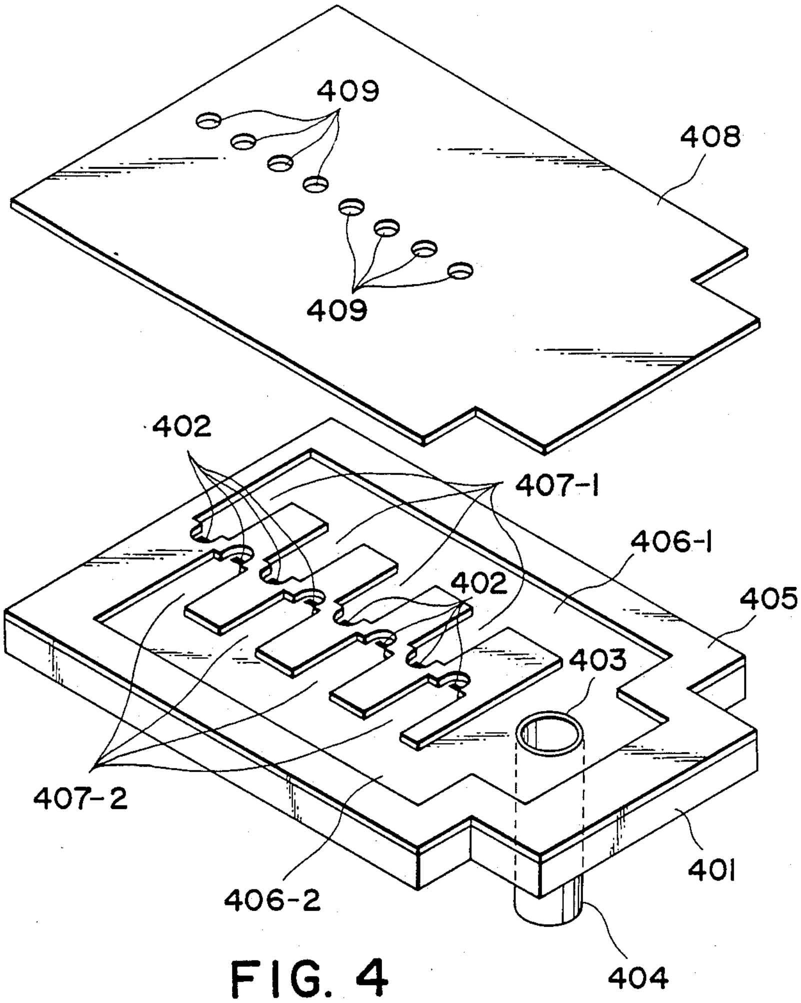
FIGS. 4 and 6–8 are exploded perspective views of other embodiments of this invention.

FIG. 4 is an exploded perspective view of another embodiment of the present liquid-jetting head. As shown in FIG. 4, a desired number (eight in FIG. 4) of liquid-jetting-pressure-generating elements 402 such as heating elements or piezo elements are disposed on a base plate 401 made of a suitable material selected from glass, ceramics, plastics, silicon, metals, or the like. The liquid-jetting pressure is generated, when said elements 402 are heating elements, by heating their neighboring liquid therewith, and when said elements 402 are piezo elements, by mechanical oscillation of displacement thereof. These elements 402 are connected each to an input-signal-applying electrode, which is not depicted. The multilayer wiring method utilizing the vacuum deposition method and the like can be applied to the fabrication for preparing these elements and electrodes.

The base plate 401 is penetrated with a perforation 403, into which a conduit 404 is fitted. A plate 405, which is set on the upper surface of the base plate 401, has an open window of the shape shown in FIG. 4. The plate 405 can be prepared by hardening a resin composition printed in such a shape on the base plate, which is hardened thereafter; by machine-cutting, molding, or punching, a plate of silicon, glass, ceramic, plastic, or metal; or by a hardened plate resulting from image exposure and development of photosensitive resin (photoresist), followed by dissolution to remove the portion corresponding to the open window. After the plate 405 thus prepared is superposed and positioned on the base plate 401, the plate 405 is closely fixed to the base plate 401 with an adhesive, screws, or the like.

In this manner, two main liquid passages 406-1 and 406-2 and their respective branched paths 407-1 and 407-2 are formed on the base plate 401, said branched paths being all separated one from another by the teeth of comb-like part of the plate 405 which extend alternately in the opposite directions. The innermost parts of the branched paths individually face on the liquid-jetting-pressure-generating elements 402. Branched paths arranged parallel in such an alternate fashion can be fabricated to have a larger width than those arranged all parallel and adjoining to one another.

A plate 408, which is called an orifice plate and is on the upper surface of the plate 405, has liquid-jetting orifices 409 aligned to correspond with the individual elements 402. This plate 408 can be prepared in the same way from the same material as the plate 405.

The plates 405, and 408 are superposed together, adjusted so that the orifices 409 may properly face the elements 402 one by one, and securely fastened together with an adhesive, screws, or the like. The plates 405 and 408 can also be formed in advance into a single body.

Materials used for the base plate 401 and for the plates 405 and 408 are preferably highly corrosion-resistant to the ink used. If a material of poor corrosion resistance has to be used, it is preferable to subject the material to a corrosion resisting treatment prior to use.

The numbers of the elements 402, branched paths 407-1 and 407-2, and liquid-jetting orifices 409 are not particularly limited in this invention although eight is shown as these numbers in FIG. 4. Also the number of ink conduits to be fitted into the base plate 401 is not limited to one but permitted to be plural. It is also possible by modifying the embodiment of FIG. 4 to connect the main passages 406-1 and 406-2 to each other at a position downstream of the perforation 403.

The liquid-jetting head thus constructed of FIG. 4, on actuating desired elements 402 after the ink introduced through the conduit 404 has been filled into the main passages 406-1 and 406-2 and all the branched paths 407-1 and 407-2, operates to eject the ink through the orifices 409 corrcsponding to the actuated elements 402. It is possible in this case to actuate all the elements 402 concurrently or successively or a selected part of the elements 402 individually.

Figure 5:
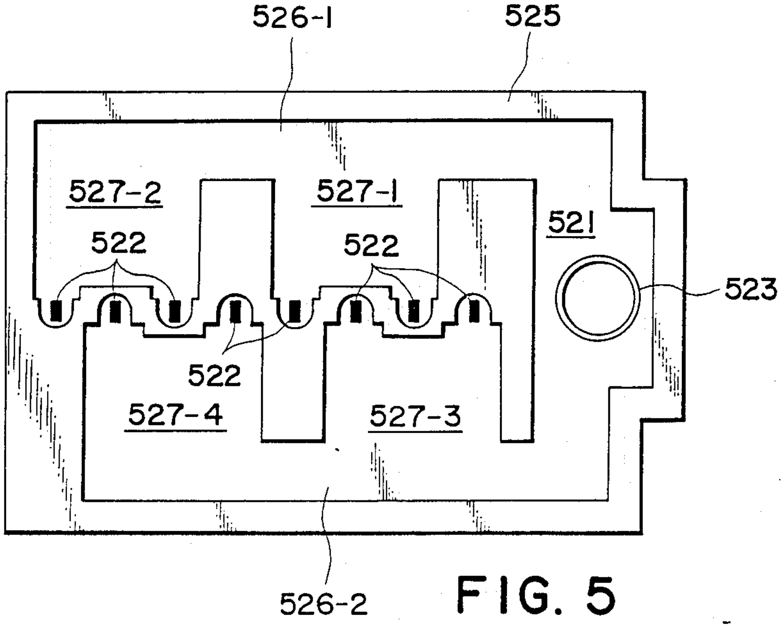
FIG. 5 is a plan view of the principal portion of another embodiment of this invention.

In the next place, an embodiment of modification of the head shown in FIG. 4, in particular the modification relating to the shape of ink paths, is illustrated with reference to FIG. 5, which is a plan view of the embodiment of which the orifice plate has been removed. In FIG. 5, 521 is a base plate and 522 represents ink-jetting-pressure-generating elements, all similar to the ones shown in FIG. 4; 525, 523, and 526-1 and 526-2 correspond to the plate 405, the perforation 403, and the main passages 406-1 and 406-2, respectively, of FIG. 4. In this embodiment, branched paths 527-1, 527-2, 527-3, and 527-4 wider than those shown in FIG. 4 communicate each with two alternate elements 522 as shown in FIG. 5. Such a structure of branched paths further improves the efficiency of ink re-filling since the resistance to ink flow through the branched paths is reduced as compared with that in the case of FIG. 4.

Figure 6:
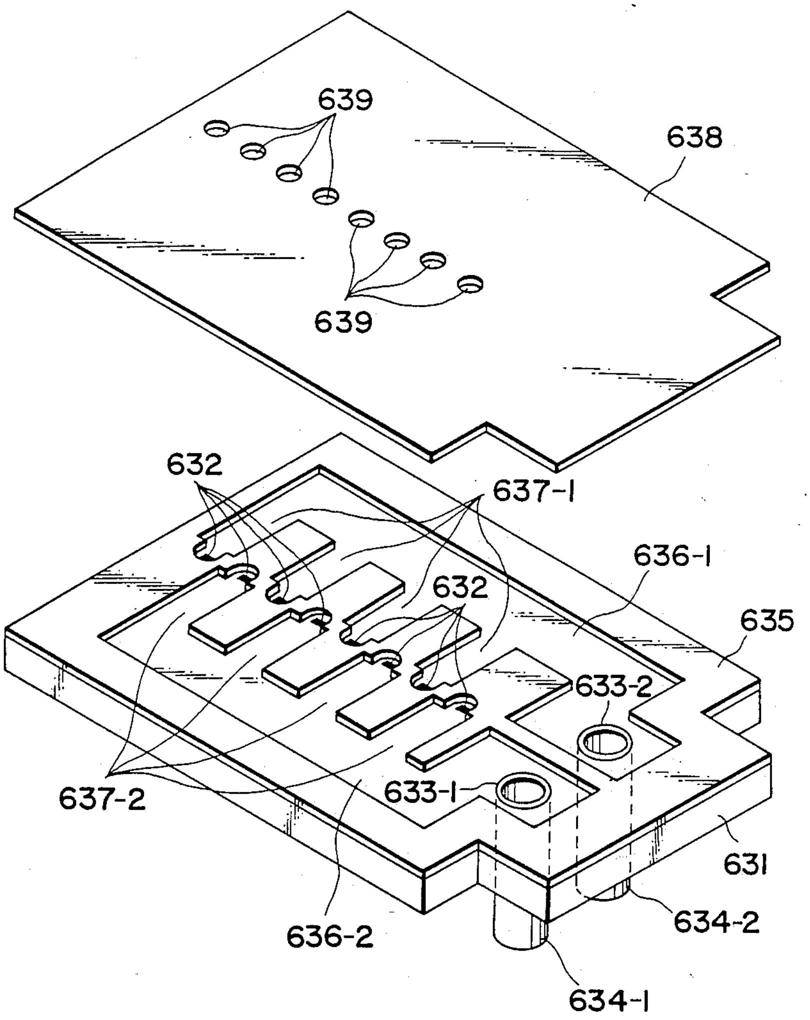
Figure 7:
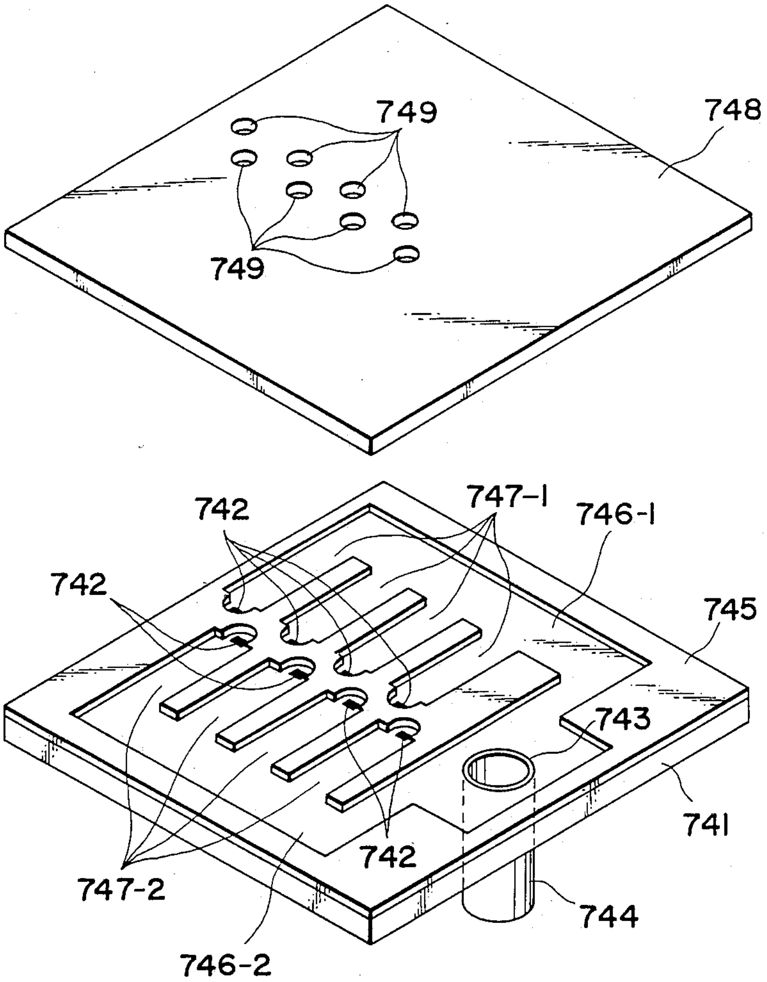
Figure 8:
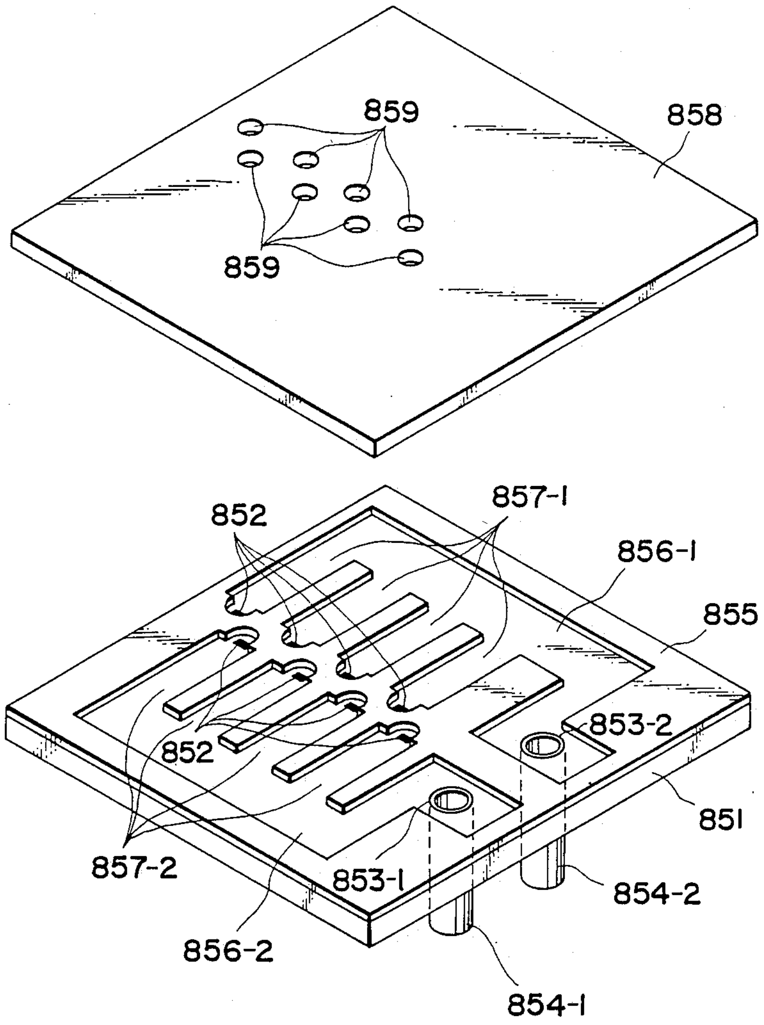

Referring further to FIGS. 6–8, other embodiments of this invention are illustrated.

In these drawings, when the last figure and the hypenated figure in the reference numeral agree with the those in FIG. 4, the former symbol has the same meaning as that of the latter; therefore the meaning will not be explained.

In the embodiment of FIG. 6, since the liquid passage consisting of a main passage 636-1 and branched paths 637-1 and the liquid passage consisting of a main passage 636-2 and branched paths 637-2 are isolated from each other, dichromatic ink-jet recording can be readily performed by introducing separately two different-color inks through liquid conduits 634-1 and 634-2.

FIG. 8 illustrates a modification of the head of FIG. 6, somewhat altered therefrom in that liquid-jetting orifices are disposed alternately on two close parallel lines. Accordingly, with the head of FIG. 8, dichromatic ink-jet recording can be readily performed as in the case with the heat of FIG. 6. The embodiments of FIGS. 6 and 8 can likewise be modified to have three or more isolated liquid passages (not depicted) with which three or more-color ink-jet recording can be performed by using three or more different-color inks.

FIG. 7 illustrates a modification of the head of FIG. 4, somewhat altered therefrom in that ink-jetting orifices are disposed alternately on two close parallel lines. Thus, according to the embodiment of FIG. 7 or 8, the head length in the direction of the alignxent of ink-jetting orifices can be reduced sufficiently. The embodiment of FIG. 7 also can be further modified similarly to the embodiment of FIG. 4 as referred thereto (not depicted).

As described above referring to FIGS. 4–8, these heads of this invention, in thin plate form, are provided with branched liquid paths of which the width is expandable at least twice as large as that of branched liquid paths arranged all parallel and adjoining to one another. Such expanded widths of branched liquid paths, having much decreased resistance to ink flow, permit a reduction of the time for refilling ink after one shot of ink-jetting and hence realize high-frequency ink jetting. In addition, since the branched liquid paths are divided in two directions (groups), it is possible to decrease the density of branched paths aligned. Therefore, liquid paths having reduced flow resistance can be disposed in lower density as compared with the density of the liquid-jetting orifices.

Thus, a high-speed recording becomes possible from the high-frequency ink-jetting function of these heads, and a high-density recording is achievable on account of the high density alignment of orifices on these heads. In addition, these heads can be constructed in a thin and compact size. Another advantage of these heads is that dichromatic or multicolor ink-jet recording can be easily performed with a single head by dividing branched liquid paths into two or more isolated groups, each of the isolated groups acting as an isolated liquid chamber.

Referring still further to FIGS. 9-A, 9-B, and 9-C, other embodiment of this invention are described.

FIG. 9-A is an external perspective view of the embodiments and FIGS. 9-B and 9-C are cross-sectional views taken on line X–X′ of FIG. 9-A.

In these drawings, 901 represents a base plate made of a material such as glass, ceramic, plastic, silicon, metal, or the like. A desired number (one in FIG. 9-B and two in FIG. 9-C) of liquid-jetting-pressure-generating elements 902 such as heating elements or piezo elements are disposed on the upper surface of the base plate 901. The jetting-pressure is generated, when the elements 902 are heating elements, by heating the neighboring liquid therewith, and when the elements 902 are piezo elements, by mechanical oscillation or displacement thereof. These elements are connected each to an input-signal-applying electrode, which is not depicted. For the connection, the multilayer wiring method currently prevailing in the semiconductor industry can be utilized which comprises forming desired patterns by photolithography on conductive films of Al, Au, or the like, which together with electric insulating films of $SiO_2$, $Si_3N_4$ or polyimide are alternately laminate.

A plate 903 is a spacer made of a similar material as used for the base plate 901 and has an internal open space which serves as a liquid chamber 904. Ink can be introduced into the liquid chamber 904 through a liquid conduit 905 fitted in a perforation, which is not depicted, penetrating the base plate 901. The conduit 905 can also be fitted into a portion of the spacer 903. The number of such conduits is not limited to what is shown in FIG. 9-A. A plate 906 made of a similar material as used for the base plate 901 is provided with liquid-jetting orifices 907*a* and 907*b*, which are disposed as close to one another as the micro-fabrication technique permits. The number of the orifices also is not limited to what is shown in FIG. 9-A; three or more, e.g. 3–5, orifices can be densely disposed per one liquid chamber 904.

Further, the elements 902 can be modified to correspond separately to the individual liquid-jetting orifices as shown in FIG. 9-C; that is, the same number of elements 902 as of the orifices can be disposed in the liquid chamber 904.

When recording paper (not depicted) is scanned with the thus constructed liquid-jetting head in the direction nearly perpendicular to the line X–X' with its orifice side surface being opposed and kept close to the paper while actuating the elements 902, droplets of ink are ejected through the orifices 907*a* and 907*b* to form ink dots on the recording paper in the same pitch as that between the orifices 907*a* and 907*b*. In other words, the distance between the ink dots by the orifice 907*a* and by the orifice 907*b* is equal to the distance between the orifices 907*a*, and 907*b;* the orifices are so close that the two ink dots 10 overlap each other; accordingly the letters printed look to consist of continuous lines, particularly in the longitudinal direction, unlike the case with the prior art ink-jetting head.

Further embodiments of this invention are 15 illustrated referring to FIG. 10-A, which is an external perspective view of the embodiment, and to FIGS. 10-B and 10-C, which are cross-sectional views taken on line Y–Y' of FIG. 10-A.

Figure 9A:
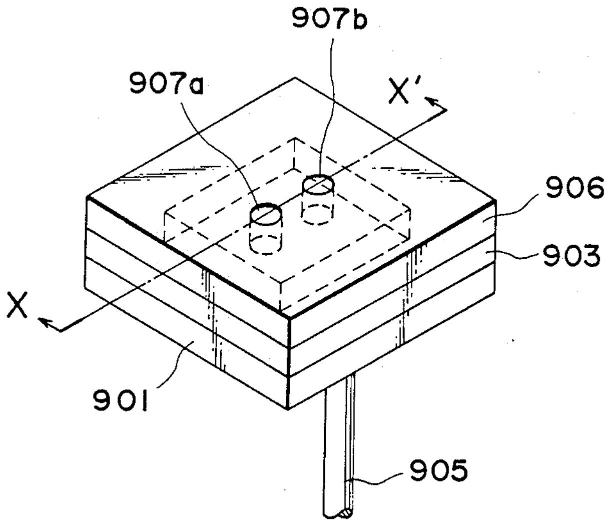
FIG. 9A is an external perspective view of other embodiments of this invention.

In these drawings; 1011 corresponds to the base plate 901 of FIG. 9A; 1012 to the liquid-jetting-pressure-generating elements 902; 1013 to the spacer 903; 1014*a*, 1014*b*, 1014*c*, and 1014*d* all to the liquid chamber 904; 1015 to the conduit 905; 1016 to the plate 906; and 1017*a*, 1017*b*, . . . , and 1017*h* all to the liquid-jetting orifices of FIG. 9.

Figure 10A:
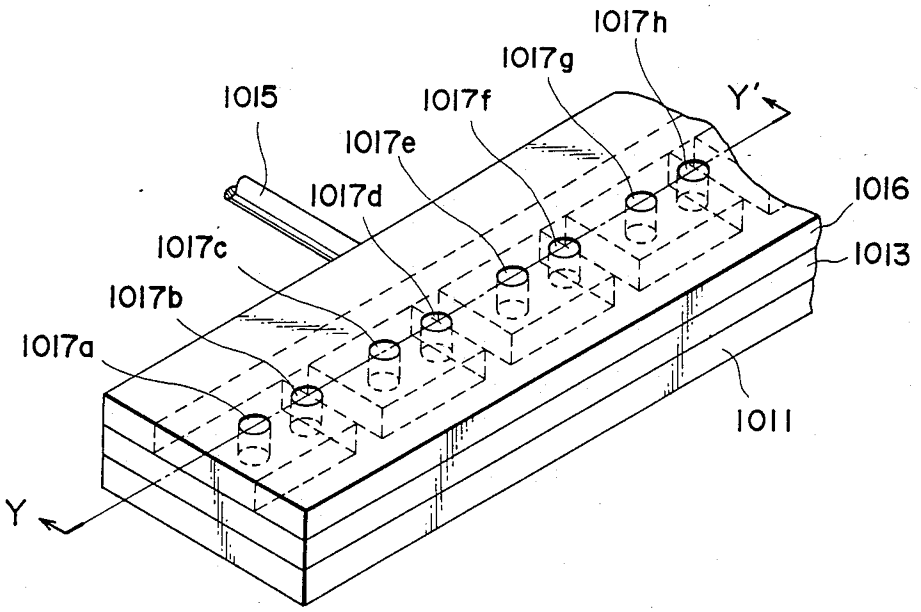
FIG. 10A is an external perspective view of embodiments of long sized type of this invention.

As in the head of FIG. 9A, the liquid-jetting orifices 1017*a*, 1017*b*, . . . , and 1017*h* are disposed linearly as shown in FIG. 10A or in zigzag form, as close to one another as the micro-fabrication technique permits. The number of these orifices is not limited to what is shown in FIG. 10-A; three or more, e.g. 3–5, orifices can be densely disposed per one liquid chamber.

In addition, the element 1012 can be modified, similarly to the embodiment shown in FIG. 9-C, so as to correspond separately to the individual liquid-jetting orifices as shown in FIG. 10-C; that is, the same number of elements 1012 as of the orifices can be disposed in each liquid chamber.

When recording paper (not depicted) is scanned with thus constructed liquid-jetting head in the direction nearly perpendicular to the line Y–Y' with its orifice side surface being opposed and kept close to the paper while actuating the elements 1012, droplets of ink are ejected through the orifices 1017*a*, 1017*b*, . . . , 1017*h* to form ink dots on the paper in the same pitch as that between the orifices. The orifices are disposed so closely each other that adjacent ink dots overlap each other; accordingly the letters printed on the paper look to consist of continuous lines, particularly in the longitudinal direction.

Moreover, when applying such long head as shown in FIG. 10A having liquid-jetting orifices disposed over the same length as the longitudinal size of the recording paper used, it is possible to complete recording over the whole area of a sheet of paper with one scanning, thus permitting a considerable reduction in recording time as compared with the case where such short heads as shown in FIG. 9A are applied.

For actuating a plurality of liquid-jetting-pressure-generating elements, either of the operational modes, simultaneous and successive, may be adopted.

As described above, the liquid-jetting heads shown in FIGS. 9 and 10 have the following advantages:

1. These heads give high-quality prints, unobtainable by the prior art, because they forms high-density ink dots, in particular densely arranged in the longitudinal direction.

2. Since the liquid-jetting orifices are disposed very adjacently to the liquid-jetting-pressure-generating elements and in very high density, these heads can be in very thin and compact form.

3. Since it is relatively easy to form finely the liquid-jettihg orifices in high density, these heads themselves can be fabricated easily in high yield.

The systems shown in FIGS. 9 and 10 can be applied to the systems as shown in FIGS. 1 and 3 to 8.

Figure 9B:
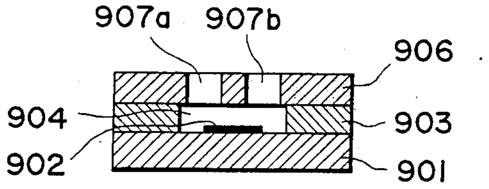
FIGS. 9B and 9C are cross-sectional views taken on line X–X′ of FIG. 9A.
Figure 10B:
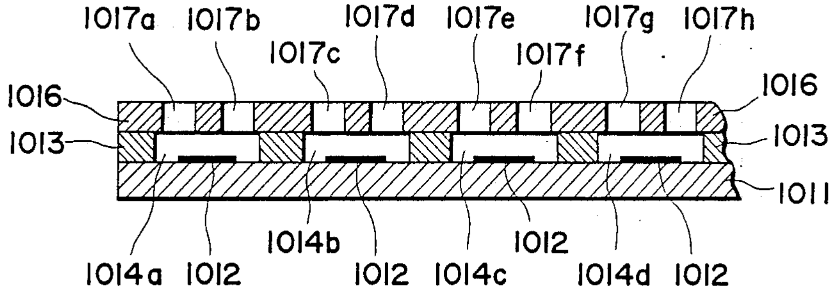
FIGS. 10B and 10C. are cross-sectional views taken on line Y–Y′ of FIG. 10A.

Firstly, the embodiments shown in FIGS. 1 and 3 to 8 can be modified in such a way that a plurality of liquid-jetting orifices correspond to one liquid-jetting-pressure-generating element as shown in FIGS. 9B and 10B. For example, in FIG. 1, each liquid-jetting orifice may be further divided into a plurality of orifices.

Figure 9C:
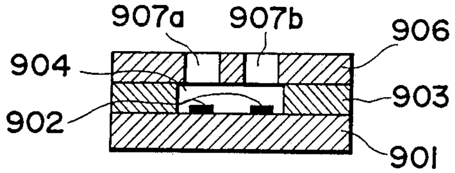
Figure 10C:
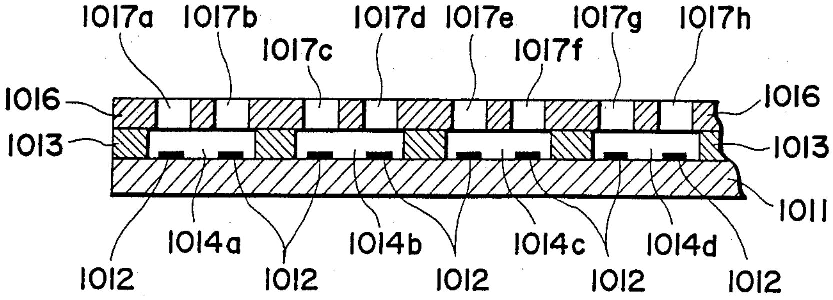

Secondly, the embodiments shown in FIGS. 1 and 3–8 can be modified in such a way that a plurality of liquid-jetting-pressure-generating elements correspond to the same number of liquid-jetting orifices as that of the elements in one liquid chamber (i.e., in each branched path) as shown in FIGS. 9C and 10C. For example, in FIG. 4, each liquid-jetting-pressure-generating element may be further divided into a plurality of elements and each liquid-jetting orifice may be divided corresponding to the division of elements.

What we claim is:

1. A method of producing a liquid-jetting head capable of recording in a plurality of colors, the method comprising the steps of:

providing a base member having a plurality of heaters thereon and a plurality of perforations therethrough, at least one plate member having at least one perforation therethrough surrounded on all sides by the plate member and having a predetermined shape, and an orifice plate having holes therethrough; and laminating the base member, plate member and orifice plate together to provide a laminated liquid-jetting head having a plurality of substantially identically shaped, separate liquid supply paths, each being in communication with an associated perforation in the base member for supplying different color recording liquids to the liquid supply paths, each liquid supply path including a main liquid path and a plurality of branched liquid paths branched off from the main liquid path, the liquid supply paths, the main liquid paths and branched liquid paths being formed by the perforation through the plate member, wherein liquid can be ejected from the liquid-jetting head through the holes in the orifice plate by the action of heat energy applied to the liquid in the branched liquid paths by the heater.

2. A method according to claim 1, wherein a plurality of the plate members are laminated with each other between the base member and the orifice plate to provide a plurality of similarly oriented liquid supply paths disposed at different levels in the laminated head.

3. A method according to claim 1, wherein a plate member is laminated between the base memeber and the orifice plate to provide the plurality of liquid supply paths as mirror-images disposed at the same level in the laminated head.

4. A liquid-jetting recording head capable of recording in a plurality of colors, the head comprising a base member having a plurality of heaters thereon and a plurality of perforations therethrough, at least one plate member having at least one perforation therethrough surrounded on all sides by said plate member, and an orifice plate having holes therethrough, wherein:

said base member, said plate member and said orifice plate are laminated together to provide a laminated liquid-jetting recording head having a plurality of substantially identically shaped, separate liquid supply paths, each being in communication with an associated perforation in said base member for supplying different color recording liquids to said liquid supply paths;

each said liquid supply path includes a main liquid path and a plurality of said branched liquid paths branched off from said main liquid path, said liquid supply paths, said main liquid paths and said branched liquid paths being formed by said perforation through said plate member; and liquid can be ejected from the liquid-jetting head through said holes in said orifice plate by the action of heat energy applied to the liquid in the branched paths by said heater.

5. A liquid-jetting recording head according to claim 4, wherein a plurality of said plate members are laminated with each other between said base member and said orifice plate to provide a plurality of similarly oriented liquid supply paths disposed at different levels in the laminated head.

6. A liquid-jetting recording head according to claim 4, wherein said plate member is laminated between said base member and said orifice plate to provide said plurality of said liquid supply paths as mirror-images disposed at the same level in the laminated head.

7. A liquid-jetting recording head according to claim 4, wherein each said main liquid path comprises an elongated space and said branch paths are spaced along said elongated space and extended laterally therefrom.

8. A liquid-jetting recording head according to claim 7, having plural sets of orifices arranged in rows, wherein every other orifice is in said same set and adjacent said orifices are arranged for ejecting liquid from a different branch path.

9. A liquid-jetting recording head according to claim 4, wherein each said branch path conveys liquid to a single said orifice.

10. A liquid-jetting recording head according to claim 4, wherein one said heater is provided for each said orifice.

11. A liquid-jetting recording head according to claim 4, wherein each said branch path includes one said heater for a plurality of said orifices.

12. A liquid-jetting recording head according to claim 4, wherein said plate member is a photosensitive resin.

13. A multi-color image recording apparatus comprising a liquid-jetting recording head, means for supplying different color recording liquid to said liquid-jetting head and means for controlling deposition of recording liquid by said liquid-jetting recording head on a recording medium, said recording head including a base member having a plurality of heaters thereon and a plurality of perforations therethrough, at least one plate member having at least one perforation therethrough surrounded on all sides by said plate member, and an orifice plate having holes therethrough, wherein:

said base member, said plate member and said orifice plate are laminated together to provide a laminated liquid-jetting recording head having a plurality of substantially identically shaped, separate liquid supply paths, each being in communication with an associated perforation in said base member for supplying different color recording liquids to said liquid supply paths;

each said liquid supply path includes a main liquid path and a plurality of said branched liquid paths branched off from said main liquid path, said liquid supply paths, said main liquid paths and said branched liquid paths being formed by said perforation through said plate member; and liquid can be ejected from the liquid-jetting head through said holes in said orifice plate by the action of heat energy applied to the liquid in the branched paths by said heater.

* * * * *

UNITED STATES PATENT AND TRADEMARK OFFICE
CERTIFICATE OF CORRECTION

PATENT NO. : 4,905,017

DATED : February 27, 1990

INVENTOR(S) : HIROSHI SUGITANI, ET AL.

It is certified that error appears in the above-identified patent and that said Letters Patent is hereby corrected as shown below:

ON TITLE PAGE:

IN [56] REFERENCES CITED

FOREIGN PATENT DOCUMENTS, "55-101466 2/1980 Japan" should read --55-101466 8/1980 Japan--.

COLUMN 1

Line 29, "ihdividual" should read --individual--.
Line 30, "exert" should read --exert on--.

COLUMN 2

Line 36, "persepective" should read --perspective--.

COLUMN 3

Line 12, "therof the" should read --thereof, the--.

COLUMN 4

Line 11, "three of" should read --three or--.
Line 38, "of" should read --or--.

COLUMN 5

Line 55, "hype-" should read --hyphenated--.
Line 56, "nated" should be deleted.

UNITED STATES PATENT AND TRADEMARK OFFICE
CERTIFICATE OF CORRECTION

PATENT NO. : 4,905,017

DATED : February 27, 1990

INVENTOR(S) : HIROSHI SUGITANI, ET AL.

It is certified that error appears in the above-identified patent and that said Letters Patent is hereby corrected as shown below:

COLUMN 6

Line 4, "heat" should read --head--.
Line 7, "three or" should read --three- or--.
Line 44, "embodiment" should read --embodiments--.
Line 65, "laminate." should read --laminated.--.

COLUMN 7

Line 30, "10" should be deleted.
Line 34, "15" should be deleted.
Line 67, "closely" should read --closely to--.

COLUMN 8

Line 17, "forms" should read --form--.
Line 25, "jettihg" should read --jetting--.

COLUMN 9

Line 4, "heater." should read --heaters.--.
Line 11, "base memeber" should read --base member--.
Line 31, "said" should be deleted.
Line 38, "the branched" should read --said branched--.

UNITED STATES PATENT AND TRADEMARK OFFICE

CERTIFICATE OF CORRECTION

PATENT NO. : 4,905,017

DATED : February 27, 1990

INVENTOR(S) : HIROSHI SUGITANI, ET AL.

It is certified that error appears in the above-identified patent and that said Letters Patent is hereby corrected as shown below:

COLUMN 10

Line 3, "branch paths" should read --branched paths--.
Line 9, "branch path." should read --branched path.--.
Line 11, "branch path" should read --branched path--.
Line 17, "branch path" should read --branched path--.
Line 20, "is a" should read --is formed of a--.
Line 24, "recording liquid" should read --recording liquids--.
Line 42, "said" should be deleted.
Line 49, "the branched" should read --said branched--.
Line 50, "heater." should read --heaters.--.

Signed and Sealed this

Twenty-third Day of June, 1992

Attest:

DOUGLAS B. COMER

Attesting Officer

*Acting Commissioner of Patents and Trademarks*